(12) United States Patent
Poovappa et al.

(10) Patent No.: US 11,949,674 B2
(45) Date of Patent: *Apr. 2, 2024

(54) MULTI-FACTOR MESSAGE AUTHENTICATION

(71) Applicant: Comcast Cable Communications, LLC, Philadelphia, PA (US)

(72) Inventors: Vinayaka Poovappa, Wayne, PA (US); Saravanan Muthusamy, Wayne, PA (US); Ken Landry, Philadelphia, PA (US); Rajesh Sonak, Sterling, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,387

(22) Filed: Jan. 20, 2023

(65) Prior Publication Data

US 2024/0031363 A1    Jan. 25, 2024

Related U.S. Application Data

(63) Continuation of application No. 17/182,768, filed on Feb. 23, 2021, now Pat. No. 11,588,815, which is a continuation of application No. 15/858,531, filed on Dec. 29, 2017, now Pat. No. 10,958,647.

(51) Int. Cl.
*H04L 29/06* (2006.01)
*H04L 9/40* (2022.01)
*H04M 3/533* (2006.01)
*H04L 67/02* (2022.01)
*H04W 4/14* (2009.01)

(52) U.S. Cl.
CPC ........ *H04L 63/0876* (2013.01); *H04L 63/123* (2013.01); *H04L 63/18* (2013.01); *H04M 3/53333* (2013.01); *H04L 63/0807* (2013.01); *H04L 67/02* (2013.01); *H04W 4/14* (2013.01)

(58) Field of Classification Search
None
See application file for complete search history.

(56) References Cited

U.S. PATENT DOCUMENTS

| 2016/0050203 | A1 | 2/2016 | Hefetz |
| 2017/0054770 | A1 | 2/2017 | Wells et al. |
| 2017/0142108 | A1 | 5/2017 | Zhang et al. |
| 2018/0176212 | A1 | 6/2018 | Nair |

*Primary Examiner* — Andrew J Steinle
(74) *Attorney, Agent, or Firm* — Banner & Witcoff, Ltd.

(57) ABSTRACT

Systems, methods, and apparatuses are described for authenticating a user device and/or user application. A user device may receive, based on a first authentication request, a plurality of messages sent over a plurality of channels of communication (e.g., a message to a URL address associated with the user device and a binary Short Message Service (SMS) message). Based on information from the messages, the user device may transmit a second authentication request.

32 Claims, 7 Drawing Sheets

MULTI-FACTOR MESSAGE AUTHENTICATION

CROSS-REFERENCE FOR RELATED APPLICATION

This application is a continuation of U.S. patent application Ser. No. 17/182,768, filed Feb. 23, 2021, which is a continuation of U.S. patent application Ser. No. 15/858,531 (now U.S. Pat. No. 10,958,647), filed Dec. 29, 2017, each of which is hereby incorporated by reference in its entirety.

BACKGROUND

Network operators or service providers may provide voicemail services. Because subscriber identity module (SIM) credentials are generally required by the network operators or service providers to provide access to their network, network operators or service providers are able to use these SIM-based credentials to perform a network-based authentication. However, since SIM credentials are generally not shared across multiple network operators or service providers, virtual network operators or service providers may not have access to SIM credentials.

BRIEF SUMMARY

Methods, systems, and apparatuses are described for authenticating a mobile device and/or user application using multi-factor (e.g., two-factor) authentication. A mobile device may transmit an authentication request to a server. The server may respond by transmitting a plurality (e.g., two) of messages over a plurality (e.g., two) channels of communication. For example, a first message (e.g., an Hypertext Transfer Protocol (HTTP) message) may be sent to a URL address associated with a user device, and a second message (e.g., a binary Short Message Service (SMS) message) may be sent to a mobile data number associated with the user device. The messages may comprise information, such as a hash value. The mobile device may transmit a second authentication request to the server comprising information it received from the server. The server may verify the information is consistent and authenticate the user device.

DETAILED DESCRIPTION

Apparatuses, systems and methods disclosed herein may authenticate a user device and/or user application. A user device may receive, based on a first authentication request, a plurality (e.g., two) messages sent over a plurality (e.g., two) channels of communication (e.g., a message to a URL address associated with the user device and a binary Short Message Service (SMS) message). Based on information from the plurality of messages, the user device may transmit a second authentication request.

Figure 1:
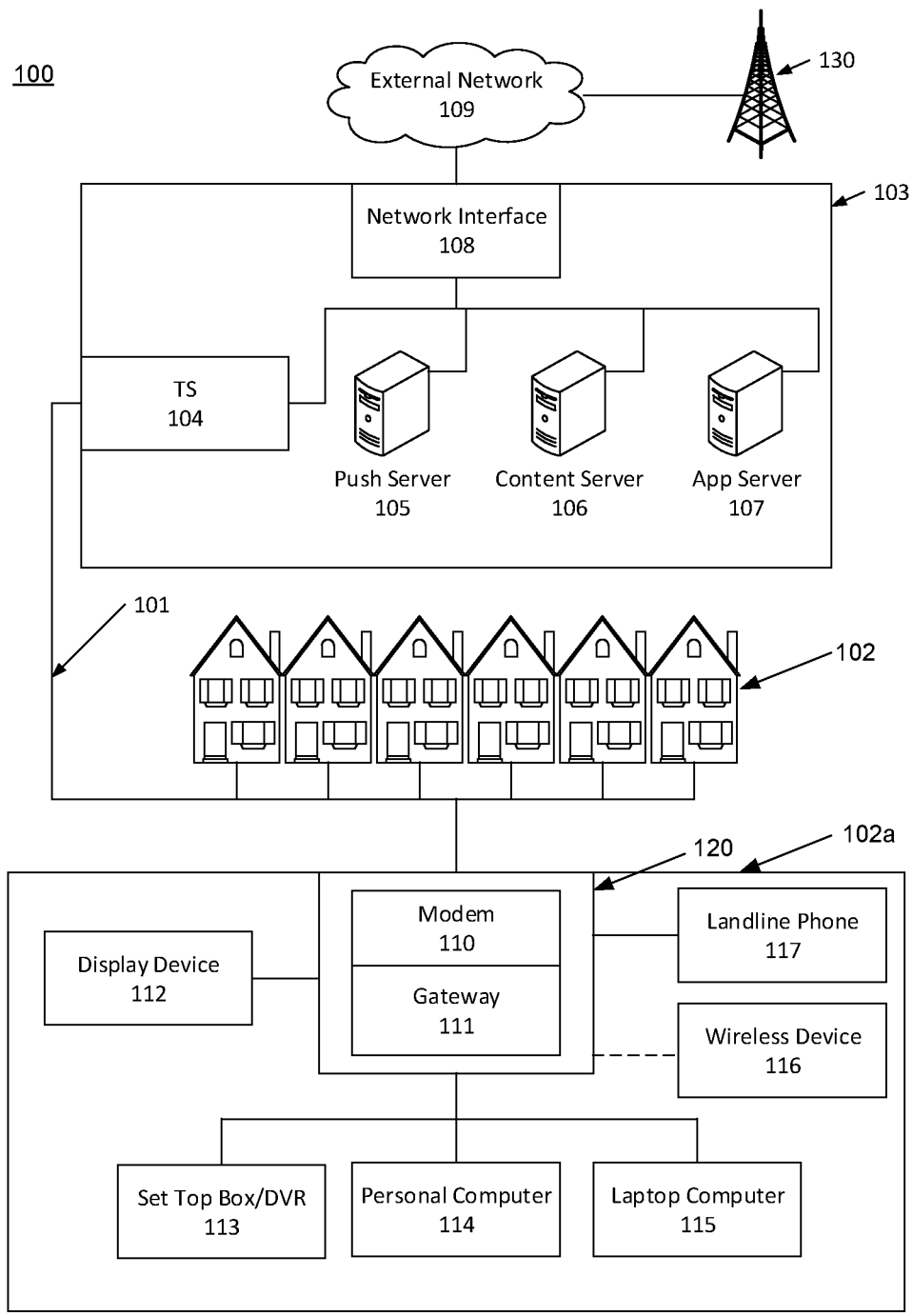
FIG. 1 shows an example communication network on which the example methods, systems, and apparatuses may be implemented.

FIG. 1 shows an example information distribution network in which the example methods, systems, and apparatuses may be implemented. The example information distribution network is only one example of a network and is not intended to suggest any limitation as to the scope of use or functionality of the disclosure. The example network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, switches, routers, and/or other components for communicating data.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The gateway 111 may be any computing device for communicating with the modem 110 to allow one or more other devices in the example home 102a to communicate with the local office 103, the one or more external networks 109, and/or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, etc.), or any other device. The gateway 111 may be a wireless router and/or hotspot, which may be configured to provide service to one household and/or other users.

Figure 2:
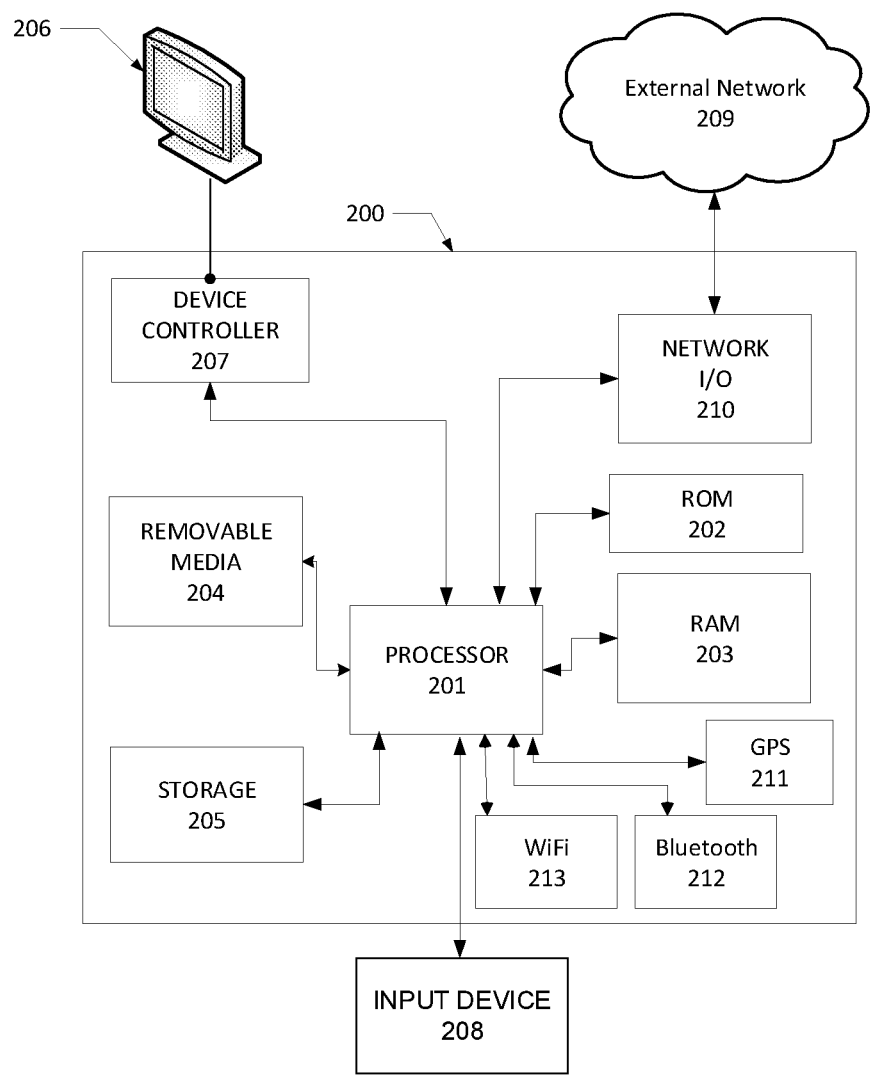
FIG. 2 shows an example computing device that may be used to implement any of the system, methods, servers, entities, and computing devices described herein.

FIG. 2 shows general hardware elements that may be used to implement any of the various computing devices (e.g., smart phones, tablets, servers, or other computers) discussed herein. A device 200 may include one or more processors 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, and/or any other desired electronic storage medium. Instructions may also be stored in an attached (or internal) storage 205, such as an internal or external hard drive.

The device 200 may include one or more output devices, such as a display 206 (e.g., an integrated or external display, monitor, and/or television), and may include a device controller 207, such as a video processor. The device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. The network I/O interface 210 may include a cable modem, and the network 209 may include the communication links 101 shown in FIG. 1; the one or more external networks 109; an in-home network; a provider's wireless, coaxial, fiber, or hybrid fiber/coaxial distribution system (e.g., a DOCSIS network); and/or any other desired network. Additionally, the device may include a location-detecting device, such as a global positioning system (GPS) microprocessor 211, which may be configured to receive and process global positioning signals and determine, with possible assistance from an external server and antenna, a geographic position of the device. The device may also include a Bluetooth enabled transceiver 212 and/or a Wi-Fi access point 213.

Figure 3:
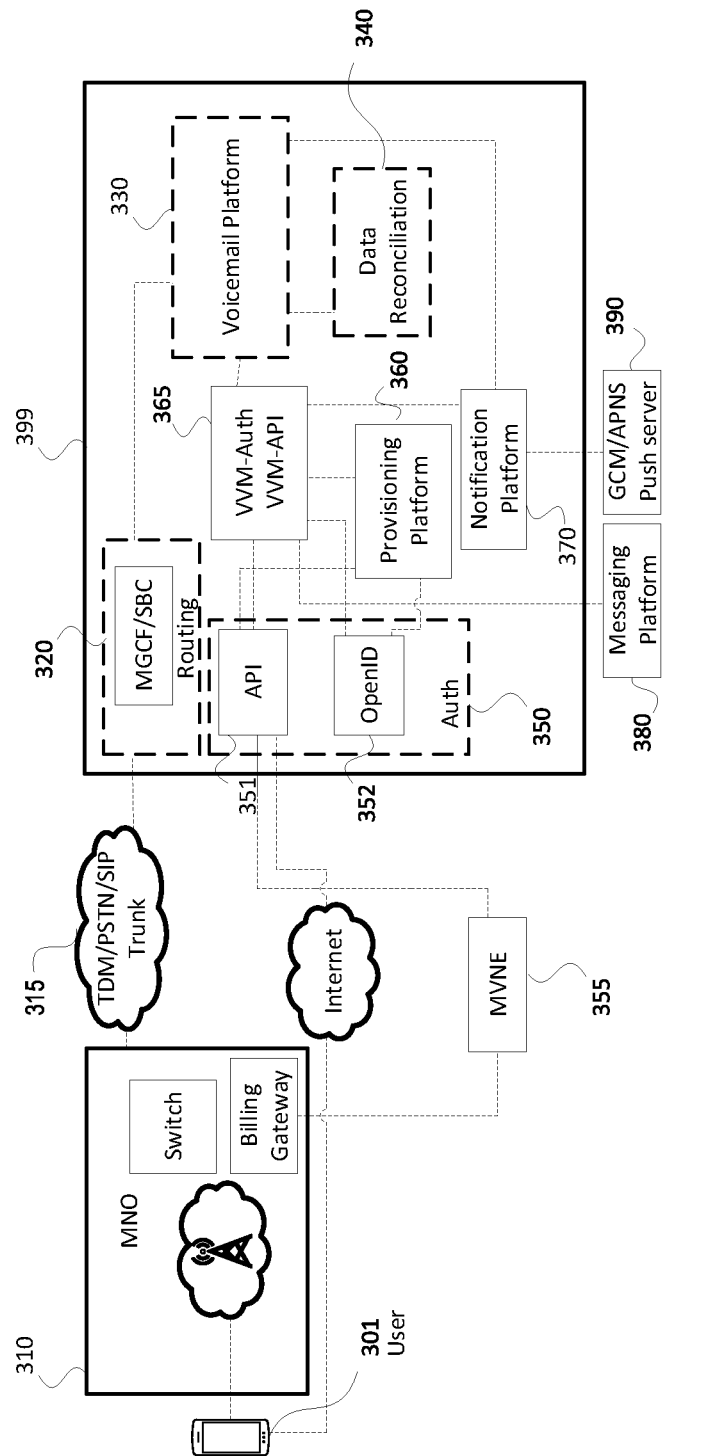
FIG. 3 shows an example end-to-end architecture and authentication flow.

FIG. 3 shows an example end-to-end architecture and authentication flow. A user device 301 may be, for example, a smartphone, a tablet, a computer, or any other computing device, including any device with SIM card capability. The user device 301 may be associated with one or more users. A back-office infrastructure 399 may be capable of providing a series of hardware and software solutions for various applications. It may provide provisioning, routing, authentication, etc., as well as services specific to an application, such as voicemail. The back-office infrastructure 399 may be comprised of a single server, or multiple servers. A user may subscribe to services associated with the back-office infrastructure, such as voicemail services.

The user device 301 may communicate with the back-office infrastructure through a Mobile Network Operator (MNO) network 310. The MNO network 310 may comprise a wireless network carrier, such as Verizon, Sprint, T-Mobile, AT&T, etc. Additionally or alternatively, the user device 301 may communicate with the back-office infrastructure 399 via the internet.

The user device 301 may communicate with an MNO network 310. The MNO network may comprise a Radio Access Network (RAN) and a core network, which may be used to pass on call services (such as outgoing calls, incoming calls, etc.).

A user may have subscribed to voicemail services through a provider associated with the back-office infrastructure. The voicemail service may record and store voicemail messages, and may alert the user that a voicemail message has been received and recorded. The voicemail service may provide the user access to the recorded voicemail. The user device and or application may be authenticated prior to notifying the user and/or prior to providing the user access to the voicemail.

The MNO Network 310 may provision a user device to forward all voicemails to a pilot number using a provisioning protocol and/or billing gateway. An example provisioning protocol and/or billing gateway may be RSSx. The provisioning step may occur for a first time prior to the call processing. The MNO network 310 may use knowledge of a device's SIM card to provision the number.

For example, if a user is unable to answer a call, or has otherwise directed a call to voicemail, instead of the call going to the local MNO's voicemail box, the call may be forwarded over the Public Switched Telephone Network (PSTN), or Time-Division Multiplexing (TDM) Trunk, or Session Initiation Protocol (SIP) trunk 315 to a pilot number in order to reach the back-office infrastructure 399. The call forwarding system may be designed so that all forwarded calls are forwarded to a single pilot number, or multiple pilot numbers may be used.

At the back-office infrastructure 399, after receiving a forwarded voicemail, the back-office infrastructure 399 may look at the forwarded message and identify the original caller, the forwarded-to number, and/or the account holder of the forwarded-to number.

A call forwarded to the back-office infrastructure 399 may first be received by a routing module 320. The routing module 320 may include a Media Gateway Control Function (MGCF) and/or a Session Border Controller (SBC). The MGCF may be used for TDM trunks and/or PSTN trunks. An SBC may be used for SIP trunks. The MGCF/SBC may take as an input voice signals or some other type of media.

For example, the media input could be a streaming voice file from a call. The routing module 320 may recognize that an incoming call has been forwarded to the pilot number, and as a result, may route the call to the voicemail module 330.

The voicemail module 330 may then terminate the incoming call. Terminating the incoming call may include answering the incoming call and playing a voicemail recording message such as "the user you reached is not available, please leave a message," or any other standard or user-created message. The voicemail module may then record and store the message. The message may be stored as an audio message. Recording and storing the message may further comprise processing the voicemail with speech to text recognition, and storing a text version of the voicemail. The text version of the voicemail may then be provided to a visual voicemail (VVM) application executing on (or in connection with) user device 301.

The voice mailbox settings may be backed up at the Data Reconciliation platform 340. A user's configuration settings may be stored so that, if the voicemail platform needs to be reset (e.g., if there is a system failure or if system data has for some other reason been corrupted), all of the settings for a user's voicemail continue to be stored in a secure fashion that may be recreated.

Before transmitting a notification to a user device that a voicemail message has been recorded, the voicemail platform may verify that the particular application on the device that is to receive the notification is authenticated. The authentication may happen as soon as the device is turned on, before any call is even made. Authentication may occur over the internet, such as through the MNO network or Wi-Fi.

The user device may be connected over the internet to an Authentication Module 350. The Authentication module may include a platform or Application Program Interface (API) 351 that allows users of applications (apps) or widgets that are developed for user devices on the internet to authenticate themselves to a network associated with the back-office infrastructure 399. The API 351 may provide authentication services, security services, secured transfers of information between applications on other devices that are authenticated to the network and provide that API and interface into the network. The Authentication Module 350 additionally or alternatively may comprise an OpenID authentication server 352 (OpenID). The OpenID authentication server may identify the user, manage the user, authenticate the user and authenticate the user device as it comes in through the internet, such as through an MNO network, an Ethernet connection, or Wi-Fi.

The Provisioning Platform 360 may be a back-office platform that communicates with the user device through the MNO. The Provisioning Platform 360 may communicate with the MNO network 310 directly. Additionally or alternatively, the Provisioning Platform may communicate with the MNO network 310 through a Mobile Network Operator Enabler (MVNE) 355, such as Arterra.

The VVM-Authentication and VVM-API 365 may communicate with the Provisioning Platform 360 to authenticate a device and/or application. The VVM-Authentication and VVM-API are described in more detail below with respect to FIG. 5 and the Provisioning Authentication Platform 593 and the Provisioning API 594.

A Messaging Platform 380 may be used to transmit messages such as text messages, emails, or other alerts. The Messaging Platform may use a short message service (SMS) aggregator, such as a Short Message Service Center (SMSC), to transmit an SMS message to a subscriber.

Once the voicemail message is recorded and stored, if the user device has been authenticated (e.g., as discussed herein), a notification may be transmitted to the user device 301. The notification may be an SMS text message, an email, a pop-up from an app, or any other type of notification. The voicemail platform 330 may notify a user device directly. Additionally or alternatively, the voicemail platform 330 may transmit a message to a notification platform 370. The notification may then be sent to the user, for example through a Push Server 390, such as Google Cloud Messaging (GCM) platform to transmit a Google push notification, and/or through an Apple Push Notification Services (APNS) for an Apple phone such as an iPhone.

Figure 4:
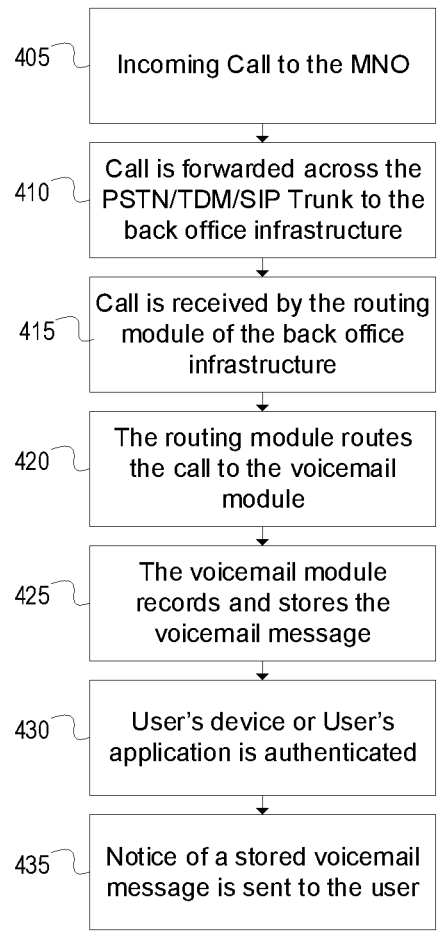
FIG. 4 is a flow chart of an example method for processing an incoming voicemail.

FIG. 4 is a flow chart of an example method for processing an incoming voicemail. At step 405, an incoming call to the MNO may be received. At step 410, if the user is unable to answer a call, or has otherwise directed a call to voicemail, instead of the call going to the local MNO's voicemail box, the call may be forwarded over the PSTN, TDM or SIP trunk 315 to a pilot number in order to reach the back-office infrastructure 399. The call forwarding system may be designed so that all forwarded calls are forwarded to a single pilot number, or multiple pilot numbers may be used.

At step 415, the call may be received by a routing module of the back-office infrastructure. At step 420, the routing module may route the call to the voicemail module. At step 425, the voicemail module may record and store the voicemail message. Recording and storing the voicemail message may comprise using speech to text recognition. The voicemail audio and/or the voicemail text may be stored.

At step 430, the server may determine that the user device and/or application has been authenticated and that the user device and/or application may receive notifications and may access the voicemail (e.g., based on an access token stored by an application on the user device). Authentication protocol is described in more detail below with respect to FIG. 5. At step 435, a notification of the stored voicemail may be sent to the user device. The notification may be sent as a text message, an email, a pop-up from an application, or any other type of notification. The notification may be sent to the user, for example through a Google Cloud Messaging (GCM) platform to transmit a google push notification, and/or through an Apple Push Notification Services for an Apple phone such as an iPhone.

Figure 5:
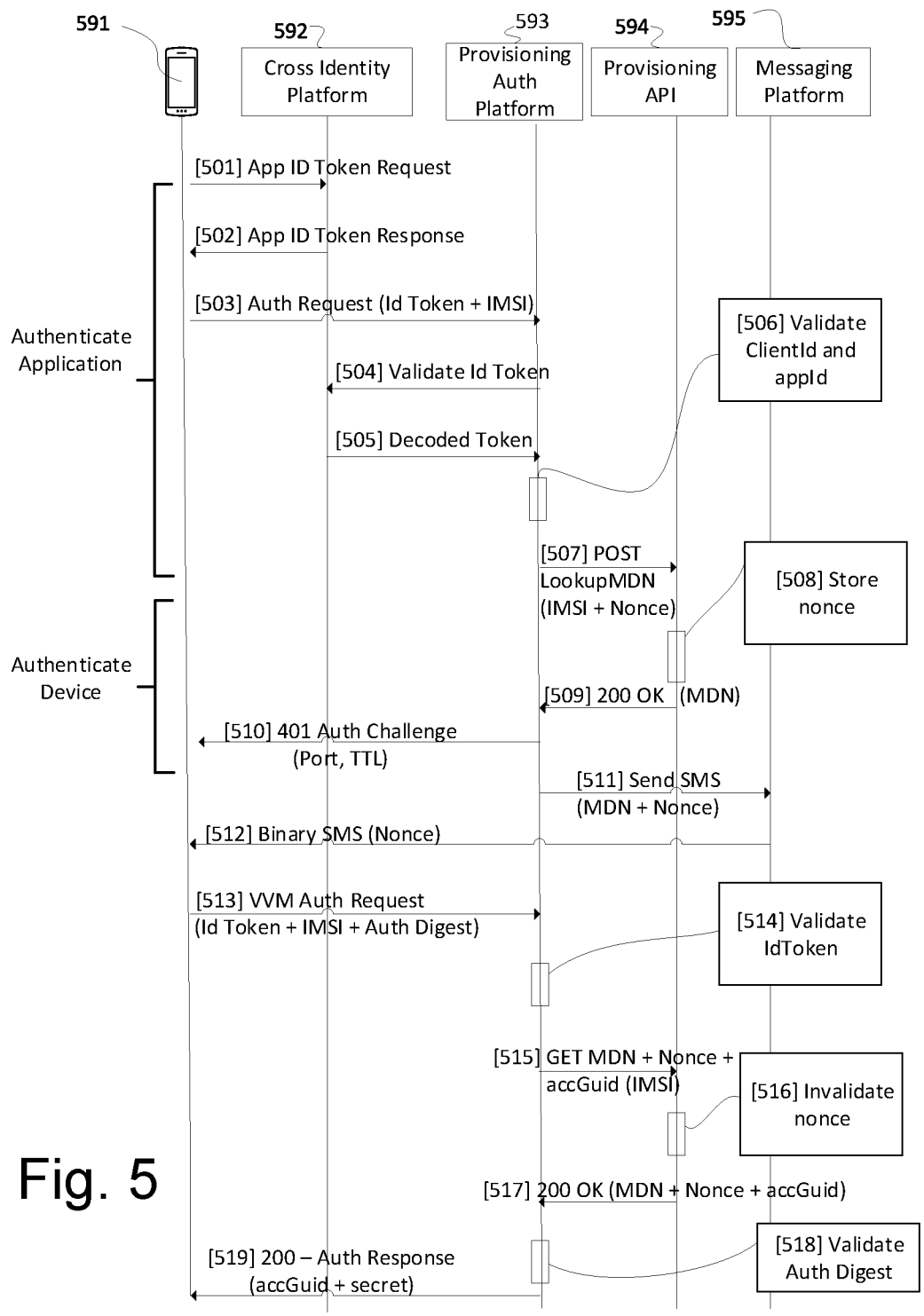
FIG. 5 shows an example authentication architecture flow.

FIG. 5 shows example message flows for authenticating a user device. A device may be authenticated at or after the device is activated, such as, for example, where an application corresponding to the server is downloaded onto a mobile device. The authentication additionally or alternatively may occur at or after a device is restarted, or at or after an application is updated. Once authenticated, an application may store in memory an authentication token. The authentication token may be stored in the application memory. The authentication token may not be writable to the device storage.

At step 501, the mobile device application on user device 591 may transmit an application Identification (app ID) token request to a cross-identity platform 592 such as Google Identity Platform (Google IDP). The cross identity platform 592 tracks signature token IDs for different applications, allowing detection of a malicious third party pretending to own the same application. For example, the cross identity platform may be used to validate an Android application signature to confirm it belongs to the provider of the services.

At step 502, the cross-identification platform 592 may reply with an App ID token response, embedding a token identification. At step 503, the mobile device application may generate and transmit an authentication request to an authentication server 593. The authentication request may comprise the token identification. The authentication request additionally or alternatively may comprise a unit identifier, such as an International Mobile Subscriber Identity (IMSI). The IMSI may, for example, be 15 digits, which may be associated with mobile phone systems such as a global system for communication or universal mobile telecommunication system (UMTS).

At steps 504-506, the authentication server 593 may validate the mobile device message by transmitting the token identification to the cross identity platform 592, and receiving a decoded token in response that may be compared with the mobile device application's unique identifier. At this point, the authentication server may have confirmed it is communicating with the correct entity.

At step 507, the authentication platform 593 may transmit an HTTP Post message comprising the unit identifier and a nonce value to an API 594. The nonce value may be a one-time authentication token or other temporary token. It may be generated by a hash algorithm or otherwise randomly generated.

At step 508, the nonce value may be stored. Additionally or alternatively, the unit identifier may be used to look up the Mobile Data PIN Number (MDN) of the user device. The MDN may be the phone number associated with the mobile user device. At step 509, a response to the HTTP post request may be transmitted from the API to the authentication platform. The response may be a 200 OK message containing the MDN of the user device.

At step 510, the authentication platform may transmit to the mobile user device an authentication challenge message containing a port and time to live (TTL) information. The message may be a 401 HTTP message, and it may be transmitted to a URL associated with the user device. At steps 511-512, the authentication platform 593, through a Messaging Platform 595, may also transmit a binary SMS message to the user device 591, containing the nonce value that was stored at step 508. Thus, the mobile device may receive an authentication challenge over the internet, and a separate binary SMS message containing a nonce value. The user device application may generate an Authentication Digest (Auth Digest) based on the nonce value. At step 513, the user device application may generate and transmit a second authentication request. The second authentication request may comprise the ID Token, the unit identifier (i.e. IMSI), and the Auth Digest.

At step 514, the Authentication Platform 593 may validate the ID token to again confirm the user device application belongs to the provider of the services. At steps 515-517, the Authentication Platform 593, through the API 594, may get the MDN, the nonce value stored at step 508, and the unit identifier that corresponds to the ID token. At step 518, the Authentication Platform 593 may validate the authentication digest information by comparing the stored values retrieved at step 515-517 with the values transmitted from the user device as part of the Auth Digest. At step 519 the Authentication Platform 593 may transmit an Authentication response. The authentication response may comprise an access token if the user device application has been authenticated. The user device application may then store the access token.

Figure 6:
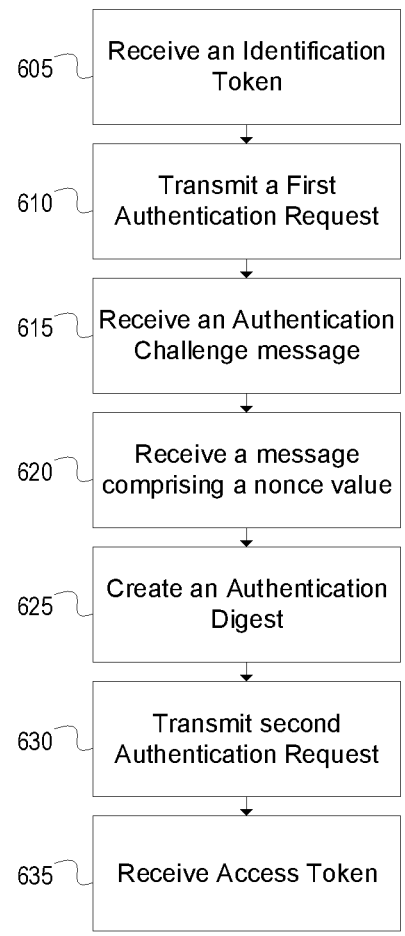
FIG. 6 shows an example process performed by a user device application for authenticating a user device application.

FIG. 6 shows an example process performed by a user device application for authenticating the user device application. In other examples, the process may include additional steps and/or omit shown steps. At step 605, the user device application may receive an identification token. The identification token may have been requested by the user device application. Additionally or alternatively, the identification token may be transmitted at or after a user device first connects to a server.

At step 610, the user device application may generate and transmit a first authentication request. The authentication request may comprise the Identification Token received at step 605. The authentication request additionally or alternatively may comprise a unique unit identifier, such as an IMSI. At step 615, the user device application may receive an authentication challenge message. The authentication challenge message may contain a port and TTL information. The authentication challenge message may be an HTTP message and/or other message received over the internet.

At step 620, the user device application may receive a second message comprising a nonce value. The nonce value may be a randomly generated hash identifier, or may be any other value. The message received at step 620 may be a binary SMS message and/or other message received at the mobile data number of the user. Alternatively, the first message received at step 615 may have been a binary SMS message and the second message may have been an HTTP message received over the internet. The first message and second message may be received in any order.

At step 625, the user device application may generate an authentication digest based on information in the authentication challenge message and the nonce value in the second message. At step 630, the user device application may generate and transmit a second authentication request comprising the ID token, the unit identifier, and the authentication digest. The second authentication request may be transmitted via a secure message over the internet, such as via HTTPS.

At step 635, the user device application may receive an access token, indicating the user device application has been authenticated by a server and enabling the user device application to access data on the server. The user device application may store the access token in memory. The access token may be used to access data and/or services stored on a server and/or network, and/or to access data and/or services provided by a server and/or network. For example, a Mobile Virtual Network Operator (MVNO) may provide voicemail services. Additionally or alternatively, a user device may have a voicemail application installed that allows the user to access voicemails on the MVNO network. The user may use the access token to access voicemail stored on the MVNO network. The MVNO network may request the access token before providing a notification that a user has an unread voicemail. The MVNO network additionally or alternatively may verify the access token before transmitting the voicemail message to the user device. The voicemail message may be transmitted as a text message, as an audio file, or both. The user may be able view the text message on the mobile device display.

Figure 7:
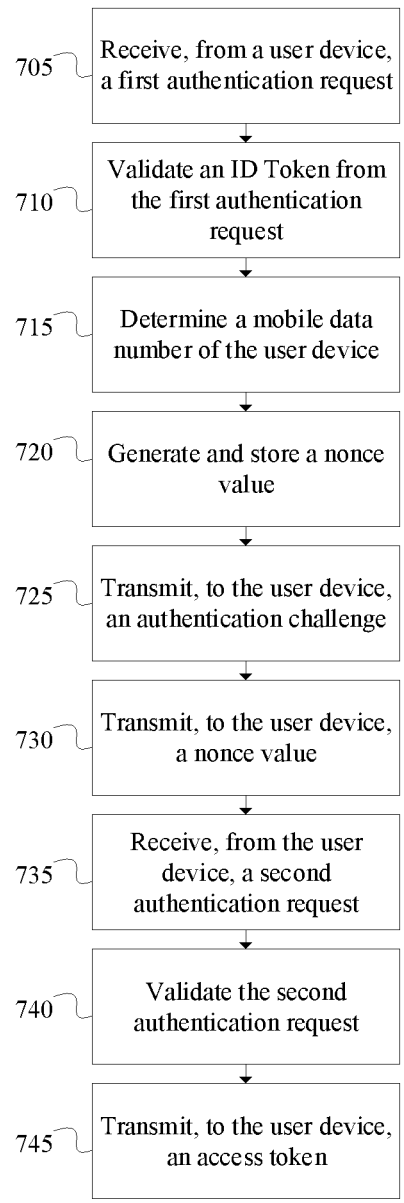
FIG. 7 shows an example process performed by a server for authenticating a user device application.

FIG. 7 shows an example process performed by a server for authenticating a user device application. In other examples, the process may include additional steps and/or omit shown steps. At step 705, the server may receive a first authentication request from a user device. The first authentication request may comprise an Identification (ID) token and/or a separate unique unit identifier, such as an IMSI.

At step 710, the server may validate the ID token. Validating the ID token may comprise transmitting the ID token to a cross-identity platform such as Google IDP and receiving a decoded token in response. At step 715, the server may determine the mobile data number (i.e. phone number) corresponding to the user device. At step 720, the server may generate and store a nonce value. The nonce value may be a randomly generated hash value, or any authentication value.

At step 725, the server may transmit an authentication challenge message. The authentication challenge message may contain a port and TTL information. The authentication challenge message may be an HTTP message and/or other message transmitted over the internet. At step 730, the server may transmit a second message comprising the nonce value generated and stored at step 720. The server may transmit the second message as a binary SMS message and/or other message received at the mobile data number of the user. Alternatively, the first message transmitted at step 725 may have been a binary SMS message and the second message transmitted at step 730 may have been a message transmitted over the internet. The first message and second message may be transmitted in any order.

At step 735, the server may receive, from the user device, a second authentication request. The second authentication request may comprise the ID token, the unit identifier, and an authentication digest comprising the nonce value. The second authentication request may be received via a secure message over the internet, such as via HTTPS. At step 740, the server may validate the second authentication request by validating that the ID token, unit identifier, and nonce value match the nonce value stored at step 720 for that ID token and unit identifier. If the authentication request is validated, at step 745 the server may authenticate the device and transmit an access token, allowing the user device to access content and/or services through the server.

Although examples are described above, the various features and steps may be combined, divided, omitted, rearranged, revised and/or augmented in any desired manner, depending on the specific outcome and/or application. Additional features may be added. Various alterations, modifications, and improvements will readily occur to those skilled in art. Such alterations, modifications, and improvements as are made obvious by this disclosure are intended to be part of this disclosure though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
sending, by a computing device, a first authentication request, wherein the first authentication request comprises an identification (ID) token associated with an application associated with the computing device;
receiving, by the computing device and based on sending the first authentication request, a message comprising a nonce value;
sending, by the computing device, a second authentication request, wherein the second authentication request comprises the ID token and an authentication digest based on the nonce value; and
receiving, by the computing device and after sending the second authentication request, an access token for the computing device.

2. The method of claim 1, further comprising accessing, based on the access token, the application.

3. The method of claim 1, further comprising receiving, after sending the first authentication request, a hypertext transfer protocol (HTTP) second message requesting transmission of the second authentication request.

4. The method of claim 1, wherein:
the message is a short message service (SMS) message, and
the second authentication request is a hypertext transfer protocol (HTTP) message.

5. The method of claim 1, wherein:
the receiving the message comprises receiving the message via a first communication channel, and
the sending the second authentication request comprises sending the second authentication request via a second communication channel different from the first communication channel.

6. The method of claim 1, further comprising:
receiving, after receiving the access token, a request for the access token; and
receiving, after receiving the request for the access token, one or more of a text file or an audio file.

7. The method of claim 1, wherein the first authentication request and the second authentication request comprise an identifier associated with the computing device, wherein the identifier comprises at least one of:
a subscriber identity;
a unit identifier; or
an international subscriber mobile identity (IMSI).

8. The method of claim 1, wherein the application comprises at least one of:
a voicemail application;
an application to access data via a communication network; or
an application to access services via a communication network.

9. The method of claim 1, wherein the nonce value comprises at least one of:
a one-time authentication token,
a temporary token,
a value generated based on a hash algorithm,
a randomly generated value.

10. An apparatus comprising:
one or more processors; and
memory storing instructions that, when executed by the one or more processors, cause the apparatus to:
send a first authentication request, wherein the first authentication request comprises an identification (ID) token associated with an application associated with the apparatus;
receive, based on sending the first authentication request, a message comprising a nonce value;
send a second authentication request, wherein the second authentication request comprises the ID token and an authentication digest based on the nonce value; and
receive, after sending the second authentication request, an access token for the apparatus.

11. The apparatus of claim 10, wherein the instructions, when executed by the one or more processors, cause the apparatus to access, based on the access token, the application.

12. The apparatus of claim 10, wherein the instructions, when executed by the one or more processors, cause the apparatus to receive, after sending the first authentication request, a hypertext transfer protocol (HTTP) second message requesting transmission of the second authentication request.

13. The apparatus of claim 10, wherein:
the message is a short message service (SMS) message, and
the second authentication request is a hypertext transfer protocol (HTTP) message.

14. The apparatus of claim 10, wherein the instructions, when executed by the one or more processors, cause the apparatus to:
  receive the message by causing receiving the message via a first communication channel, and
  send the second authentication request by causing sending the second authentication request via a second communication channel different from the first communication channel.

15. The apparatus of claim 10, wherein the instructions, when executed by the one or more processors, cause the apparatus to:
  receive, after receiving the access token, a request for the access token; and
  receive, after receiving the request for the access token, one or more of a text file or an audio file.

16. The apparatus of claim 10, wherein the first authentication request and the second authentication request comprise an identifier associated with the apparatus, wherein the identifier comprises at least one of:
  a subscriber identity;
  a unit identifier; or
  an international subscriber mobile identity (IMSI).

17. The apparatus of claim 10, wherein the application comprises at least one of:
  a voicemail application;
  an application to access data via a communication network; or
  an application to access services via a communication network.

18. The apparatus of claim 10, wherein the nonce value comprises at least one of:
  a one-time authentication token,
  a temporary token,
  a value generated based on a hash algorithm,
  a randomly generated value.

19. A method comprising:
  receiving, by a computing device, a first authentication request, wherein the first authentication request comprises an identification (ID) token associated with an application associated with a user device;
  causing sending, based on validating the ID token, a message comprising a nonce value;
  receiving a second authentication request, wherein the second authentication request comprises the ID token and an authentication digest based on the nonce value; and
  based on authenticating the user device by validating the authentication digest, sending an access token for the user device.

20. The method of claim 19, wherein the first authentication request and the second authentication request comprise an identifier associated with the user device, and wherein the validating the authentication digest comprises validating the authentication digest based on:
  a stored value, of the nonce value, corresponding to the ID token and
  a stored value, of the identifier, corresponding to the ID token.

21. The method of claim 19, wherein:
  the causing sending the message comprises causing sending the message via a first communication channel, and
  the receiving the second authentication request comprises receiving the second authentication request via a second communication channel different from the first communication channel.

22. The method of claim 19, wherein the causing sending the message comprises causing sending the message as a short message service (SMS) message, and wherein the method further comprises sending, to the user device, a hypertext transfer protocol (HTTP) second message requesting transmission of the second authentication request.

23. The method of claim 19, further comprising sending, after receiving the ID token and to the user device, a second message that indicates a port indicator and a time to live (TTL) indicator, wherein the authentication digest is further based on at least one of the port indicator or the TTL indicator.

24. The method of claim 19, wherein the nonce value comprises at least one of:
  a one-time authentication token,
  a temporary token,
  a value generated based on a hash algorithm,
  a randomly generated value.

25. The method of claim 19, wherein the first authentication request comprises an identifier associated with the user device, and wherein the method further comprises:
  determining, based on the identifier associated with the user device, a phone number associated with the user device, wherein the causing sending the message comprising the nonce value comprises causing sending, based on the phone number, the message comprising the nonce value.

26. An apparatus comprising:
  one or more processors; and
  memory storing instructions that, when executed by the one or more processors, cause the apparatus to:
    receive a first authentication request, wherein the first authentication request comprises an identification (ID) token associated with an application associated with a user device;
    cause sending, based on validating the ID token, a message comprising a nonce value;
    receive a second authentication request, wherein the second authentication request comprises the ID token and an authentication digest based on the nonce value; and
    based on authenticating the user device by validating the authentication digest, send an access token for the user device.

27. The apparatus of claim 26, wherein the first authentication request and the second authentication request comprise an identifier associated with the user device, and wherein the instructions, when executed by the one or more processors, cause the apparatus to validate the authentication digest by causing validating the authentication digest based on:
  a stored value, of the nonce value, corresponding to the ID token and
  a stored value, of the identifier, corresponding to the ID token.

28. The apparatus of claim 26, wherein the instructions, when executed by the one or more processors, cause the apparatus to:
  cause sending the message by causing sending the message via a first communication channel, and
  receive the second authentication request by causing receiving the second authentication request via a second communication channel different from the first communication channel.

29. The apparatus of claim 26, wherein the instructions, when executed by the one or more processors, cause the apparatus to:
  cause sending the message by causing sending the message as a short message service (SMS) message, and
  send, to the user device, a hypertext transfer protocol (HTTP) second message requesting transmission of the second authentication request.

30. The apparatus of claim 26, wherein the instructions, when executed by the one or more processors, cause the apparatus to send, after receiving the ID token and to the user device, a second message that indicates a port indicator and a time to live (TTL) indicator, wherein the authentication digest is further based on at least one of the port indicator or the TTL indicator.

31. The apparatus of claim 26, wherein the nonce value comprises at least one of:
  a one-time authentication token,
  a temporary token,
  a value generated based on a hash algorithm,
  a randomly generated value.

32. The apparatus of claim 26, wherein the first authentication request comprises an identifier associated with the user device, and wherein the instructions, when executed by the one or more processors, cause the apparatus to:
  determine, based on the identifier associated with the user device, a phone number associated with the user device, and
  cause sending the message comprising the nonce value by causing sending, based on the phone number, the message comprising the nonce value.

* * * * *

UNITED STATES PATENT AND TRADEMARK OFFICE
CERTIFICATE OF CORRECTION

| | |
|---|---|
| PATENT NO. | : 11,949,674 B2 |
| APPLICATION NO. | : 18/157387 |
| DATED | : April 2, 2024 |
| INVENTOR(S) | : Poovappa et al. |

It is certified that error appears in the above-identified patent and that said Letters Patent is hereby corrected as shown below:

In the Claims

Column 10, Line 23:
In Claim 7, delete "subscriber mobile" and insert --mobile subscriber--

Column 11, Line 24:
In Claim 16, delete "subscriber mobile" and insert --mobile subscriber--

Column 11, Line 58:
In Claim 20, after "token", insert --,--

Column 12, Line 55:
In Claim 27, after "token", insert --,--

Signed and Sealed this
Fifteenth Day of July, 2025

Coke Morgan Stewart
*Acting Director of the United States Patent and Trademark Office*